United States Patent
Aslam et al.

(10) Patent No.: US 9,928,050 B2
(45) Date of Patent: *Mar. 27, 2018

(54) AUTOMATIC RECOGNITION OF WEB APPLICATION

(71) Applicant: Microsoft Technology Licensing, LLC, Redmond, WA (US)

(72) Inventors: Bilal Aslam, Redmond, WA (US); Mohammed Parvez Shaikh, Bellevue, WA (US); Kristina Halfdane, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 10 days.

This patent is subject to a terminal disclaimer.

(21) Appl. No.: 14/977,326

(22) Filed: Dec. 21, 2015

(65) Prior Publication Data
US 2016/0110180 A1    Apr. 21, 2016

Related U.S. Application Data

(63) Continuation of application No. 13/159,044, filed on Jun. 13, 2011, now Pat. No. 9,244,709.

(51) Int. Cl.
*G06F 9/44* (2006.01)
*G06F 9/445* (2006.01)
(Continued)

(52) U.S. Cl.
CPC .............. *G06F 8/61* (2013.01); *G06F 8/60* (2013.01); *G06F 9/4446* (2013.01); *G06F 9/45529* (2013.01); *H04L 67/02* (2013.01)

(58) Field of Classification Search
CPC ....... H04L 67/02; H04L 69/329; H04L 29/06; G06F 9/5027; G06F 9/5083; G06F 8/60; G06F 8/61; G06F 9/4446
See application file for complete search history.

(56) References Cited

U.S. PATENT DOCUMENTS

6,745,238 B1    6/2004    Giljum et al.
7,406,664 B1    7/2008    Morton et al.
(Continued)

OTHER PUBLICATIONS

Goldman et al., Real-time collaborative coding in a web IDE, Oct. 2011, 10 pages.*

(Continued)

*Primary Examiner* — Thuy Dao
(74) *Attorney, Agent, or Firm* — Fiala & Weaver P.L.L.C.

(57) ABSTRACT

Methods, systems, and computer program products are provided that enable web applications to be identified, and that enable the identified web applications to be published to remote servers. Objects are accessed in storage for a developed web application. A feed is received that includes a plurality of signatures that correspond to a plurality of webapp development applications. A webapp development application used to develop the web application is identified by comparing the signatures to the objects. A web deployment package is downloaded for the identified webapp development application. The downloaded web deployment package is applied to enable the web application to be published to a server, such as by modifying settings and/or applying transformations to the objects that defined by the downloaded web deployment package.

20 Claims, 7 Drawing Sheets

(51) Int. Cl.
    *H04L 29/08*     (2006.01)
    *G06F 15/16*     (2006.01)
    *G06F 9/455*     (2018.01)

(56) References Cited

U.S. PATENT DOCUMENTS

| | | |
|---|---|---|
| 7,490,153 B1 | 2/2009 | Krishnan et al. |
| 7,594,003 B2 | 9/2009 | Davidson et al. |
| 7,650,276 B2 | 1/2010 | O'Neil et al. |
| 8,090,452 B2 * | 1/2012 | Johnson ............... G05B 19/042 |
| | | 700/17 |
| 8,166,448 B2 * | 4/2012 | Mitra ........................ G06F 8/20 |
| | | 717/100 |
| 8,255,280 B1 | 8/2012 | Kay |
| 8,255,494 B1 | 8/2012 | Boodman et al. |
| 8,266,700 B2 | 9/2012 | Sima et al. |
| 8,291,378 B2 * | 10/2012 | Arnold ...................... G06F 8/61 |
| | | 717/104 |
| 8,505,025 B2 | 8/2013 | Nakamura |
| 8,595,284 B2 | 11/2013 | Sheshagiri et al. |
| 8,769,490 B2 * | 7/2014 | Poulsen .............. G06F 9/45529 |
| | | 717/114 |
| 8,862,978 B2 | 10/2014 | Evans |
| 9,032,390 B2 * | 5/2015 | Tsuk ................... G06F 9/44526 |
| | | 717/170 |
| 9,262,142 B2 * | 2/2016 | Brauneis ................... G06F 8/60 |
| 2001/0034743 A1 | 10/2001 | Thomas |
| 2004/0158811 A1 | 8/2004 | Guthrie et al. |
| 2004/0225730 A1 * | 11/2004 | Brown ............. G06F 17/30893 |
| | | 709/224 |
| 2006/0206932 A1 | 9/2006 | Chong |
| 2006/0212857 A1 | 9/2006 | Neumann et al. |
| 2006/0282897 A1 | 12/2006 | Sima et al. |
| 2008/0059558 A1 * | 3/2008 | Singh .................. G06F 17/3089 |
| | | 709/202 |
| 2009/0044146 A1 | 2/2009 | Patel et al. |
| 2009/0060178 A1 | 3/2009 | Montgomery et al. |
| 2010/0058168 A1 | 3/2010 | Gibb et al. |
| 2011/0126192 A1 | 5/2011 | Frost et al. |
| 2011/0265164 A1 | 10/2011 | Lucovsky et al. |
| 2012/0041842 A1 * | 2/2012 | Adelman ............ G06F 17/3089 |
| | | 705/26.35 |
| 2012/0047483 A1 | 2/2012 | Amit et al. |
| 2012/0159468 A1 * | 6/2012 | Joshi ........................ G06F 8/61 |
| | | 717/172 |
| 2012/0323553 A1 * | 12/2012 | Aslam .................... G06F 9/455 |
| | | 703/28 |
| 2013/0339946 A1 | 12/2013 | Meredith et al. |
| 2014/0067559 A1 | 3/2014 | Tirk |
| 2014/0089914 A1 | 3/2014 | Kay et al. |

OTHER PUBLICATIONS

Aho et al., MDA-based tool chain for web services development, Nov. 2009, 8 pages.*
"Final Office Action Issued in U.S. Appl. No. 13/159,044", dated Mar. 20, 2014, 12 Pages.
"Final Office Action Issued in U.S. Appl. No. 13/159,044", dated Apr. 1, 2015, 14 Pages.
"Non-Final Office Action Issued in U.S. Appl. No. 13/159,044", dated Jul. 10, 2014, 10 Pages.
"Non-Final Office Action Issued in U.S. Appl. No. 13/159,044", dated Nov. 28, 2014, 14 Pages.
"Non-Final Office Action Issued in U.S. Appl. No. 13/159,044", dated May 21, 2013, 16 Pages.
"Non-Final Office Action Issued in U.S. Appl. No. 13/159,044", dated Nov. 20, 2013, 13 Pages.
"Notice of Allowance Issued in U.S. Appl. No. 13/159,044", dated Jun. 10, 2015, 8 Pages.
"Notice of Allowance Issued in U.S. Appl. No. 13/159,044", dated Sep. 16, 2015, 8 Pages.
Good, et al., "Developing Web applications with Tomcat and Eclipse", Retrieved at <<http://www.ibm.com/developerworks/opensource/library/os-eclipse-tomcat/index.html>>, Intel Corporation, May 8, 2007, pp. 1-18.
"Web Site Administration Tool Overview", Retrieved at <<http://msdn.microsoft.com/en-us/library/yy40ytx0.aspx>>, Microsoft Corporation, Retrieved Date: Apr. 7, 2011, pp. 1-3.
"How to: Publish Web Application Projects", retrieved at <<http://msdn.microsoft.com/en-us/library/aa983453.aspx>>, Microsoft Corporation, Retrieved Date: Apr. 7, 2011, pp. 1-2.
"Apache Tomcat Configuration Reference", Retrieved at <<http://tomcat.apache.org/tomcat-5.5-doc/config/host.html>>, The Apache Software Foundation, Retrieved Date: Apr. 7, 2011, pp. 1-9.
S. Pastore, "Web Application Security in a Crossing Boundaries Grid System", May 2007, 6 pages.
Dalai et al., "Evaluation of Web Application Security Risks and Secure Design Patterns", Feb. 2011, 4 pages.
Mikkonen et al., "Creating a Mobile Web Application Platform: The Lively Kernel Experiences", Mar. 2009, 8 pages.

* cited by examiner apply at least one transformation indicated in the downloaded web deployment package to at least one of the objects

802

AUTOMATIC RECOGNITION OF WEB APPLICATION

CROSS-REFERENCE TO RELATED APPLICATIONS

This application is a continuation of U.S. application Ser. No. 13/159,044, filed Jun. 13, 2011, entitled "Automatic Recognition of Web Application," now allowed, which is incorporated by reference in its entirety herein.

BACKGROUND

A web application (also known as a "web app" or "webapp") is an application that is accessible over a network such as the Internet or an intranet. A web application may be hosted in a browser-controlled environment or coded in a browser-supported language and reliant on a common web browser to render the application executable. Web applications are becoming popular due to the prevalence of web browsers, and the convenience of using a web browser as a client. The ability to update and maintain web applications without distributing and installing software on potentially thousands of client computers is one reason for their popularity, as is the inherent support for cross-platform compatibility. Examples of web applications include some blogs, webmail, online retail sales, online auctions, wikis and many other functions.

Webapp development software currently exists that may be used to develop a web application, such as Joomla!® developed by the Joomla Project Team (used to develop websites), and WordPress® (used to develop web blogs). Furthermore, publication tools exist that support the publishing of web applications developed by such webapp development software. However, current publication tools are not capable of automatically determining the underlying webapp development application used to develop the web application, and as such, is unaware of application-specific settings that have to be applied to the web application to enable publication. As a result, the publication tool cannot publish the web application to a remote server. Typically, a user of the publication tool has to manually edit files of the web application to place it in condition to be published by the publication tool.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided that enable web applications to be identified, and that enable the identified web applications to be published to remote servers. A configuration feed may be retrieved from a server that includes information that may be compared to features of the web application to identify a webapp development application used to develop the web application. After identification of the webapp development application, a web development package may be retrieved for the webapp development application. Attributes and/or other features of the package may be applied to the web application to configure the web application for local use and/or for publication.

For instance, in one method implementation, objects are accessed in storage for a developed web application. A feed is received that includes a plurality of signatures that correspond to a plurality of webapp development applications. A webapp development application used to develop the web application is identified by comparing the signatures to the objects. A web deployment package is downloaded for the identified webapp development application. The downloaded web deployment package is applied to enable the web application to be used locally and/or published to a server.

In another implementation, a web development tool in a computing device is provided. The web development tool includes a web application identifier and an install module. The web application identifier accesses objects in storage for a developed web application. The web application identifier is configured to receive a feed that includes a plurality of signatures that correspond to a plurality of webapp development applications, and to identify a webapp development application used to develop the web application by comparing the signatures to the objects. The install module is configured to download a web deployment package for the identified webapp development application, and to apply the downloaded web deployment package to enable the web application to be used locally and/or published to a server. A publication module may also be present that is configured to publish the web application to the server.

Computer program products are also described herein for enabling web applications to be identified and to be published to remote servers, and for further embodiments as described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
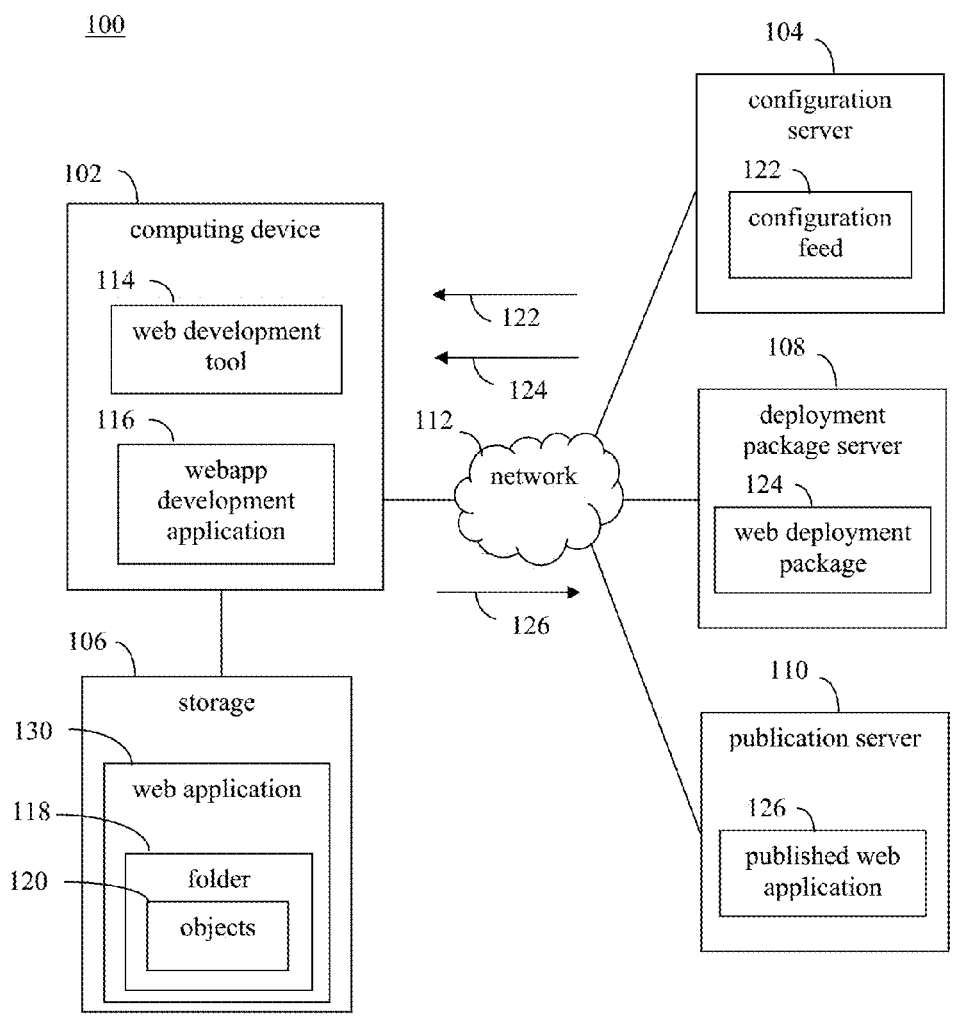
FIG. 1 shows a block diagram of a web application publishing environment, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments relate to techniques for enabling web applications developed by webapp development applications to be used locally and/or published. For instance, webapp development applications such as WordPress® and Movable Type® (developed by Six Apart of San Francisco, Calif.) enable the development of web blogs. Webapp development applications, including open source content management systems such as Joomla!®, Drupal®, XOOPS® (developed by the XOOPS Project), and TYPO3® (developed by the TYPO3 Association), and enterprise content management systems such as Alfresco® (developed by Alfresco Software, Inc.) have extended web development into new modes of interaction and communication.

Furthermore, web development tools exist that support the publishing of web applications generated by such webapp development applications. For instance, Microsoft WebMatrix®, developed by Microsoft Corporation of Redmond, Wash., is a web development tool that enables developers to build web applications capable of running on Microsoft Windows® or Linux® platforms. WebMatrix® includes a bundle of software/tools, integrating a web server (IIS Express) and a database engine (SQL (structured query language) Server Compact), supports code written using ASP.NET or PHP, installs and configures components such as PHP or MySQL, and enables web application publishing. WebMatrix® includes an editor, but also enables integration of available webapp development applications, such as the webapp development applications mentioned herein, and provides the integrated webapp development applications to be used to edit web applications. Note that WebMatrix® is mentioned herein as an example of a web development tool for purposes of illustration, and further types of web development tools exist and/or may be developed that are applicable to the embodiments described herein.

In some cases, a web application may be developed by a webapp development application that is not provided by a web development tool, and the web application may subsequently be opened by the web development tool. However, in this case, current web development tools are not capable of automatically determining the underlying webapp development application used to develop the web application. Since the web development tool cannot determine the identity of the webapp development application used to develop the web application, the tool is unaware of application-specific settings and transformations that have to be applied to the web application. Examples of such settings and transformations include pointing the web application to a new database location, changing links within the web application, copying of software used by the web application, etc. As a result, while the web application may be edited locally, aspects of local use (e.g., use on the computing device on which the web application is stored) of the web application may be impaired, and the web application the web development tool may not be able to publish the web application to a remote server.

According to embodiments, web applications developed by webapp development applications are enabled to be used locally and/or published to remote servers by a web development tool. The web development tool is enabled to determine the underlying webapp development application used to develop the web application, even if the web application is developed by a webapp development application that is not provided by the web development tool. The web development tool may apply settings and transformation to the web application for the determined webapp development application so that the web application may be locally used and/or published to a remote server.

Numerous exemplary embodiments of the present invention are described as follows. It noted that any section/subsection headings provided herein are not intended to be limiting. Embodiments are described throughout this document, and any type of embodiment may be included under any section/subsection.

II. Example Embodiments

Embodiments provide techniques for identifying web applications based on their constituent parts, and for enabling the identified web applications to be locally used and/or published. Such embodiments may be implemented in a variety of environments. For instance, FIG. 1 shows a block diagram of a web application publishing environment 100, according to an example embodiment. As shown in FIG. 1, environment 100 includes a computing device 102, a configuration server 104, storage 106, a deployment package server 108, and a publication server 110. As shown in FIG. 1, computing device 102 includes a web development tool 114 and a webapp development application 116. Environment 100 is described as follows.

Computing device 102 may be any type of stationary or mobile computing device, including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a netbook, etc.), a mobile phone (e.g., a cell phone, a smart phone such as an Apple iPhone, a Google Android™ phone, etc.), or other type of mobile device. Configuration server 104, deployment package server 108, and publication server 110 may each be implemented in one or more computer systems, including one or more servers, which may be any type of computing device described herein or otherwise known that is capable of enabling the corresponding functionality described herein.

Computing device 102, configuration server 104, deployment package server 108, and publication server 110 are communicatively coupled by network 112. Network 112 may include one or more communication links and/or communication networks, such as a PAN (personal area network), a LAN (local area network), a WAN (wide area network), or a combination of networks, such as the Internet. Computing device 102, configuration server 104, deployment package server 108, and publication server 110 may be communicatively coupled to network 112 using various links, including wired and/or wireless links, such as IEEE 802.11 wireless LAN (WLAN) wireless links, Worldwide Interoperability for Microwave Access (Wi-MAX) links, cellular network links, wireless personal area network (PAN) links (e.g., Bluetooth™ links), Ethernet links, USB links, etc.

A single computing device 102 is shown in FIG. 1 for purposes of illustration. However, any number of computing devices 102 may be present in environment 100 that are communicatively coupled with configuration server 104, deployment package server 108, and publication server 110 by network 112, including tens, hundreds, thousands, and even greater numbers of computing devices 102. As shown in FIG. 1, storage 106 is coupled to computing device 102. Storage 106 may include one or more of any type of storage mechanism, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium.

Web development tool 114 is a web development tool configured to enable developers to build and publish web applications on various computing platforms, such as one or more of Microsoft Windows®-based computer systems, Linux-based computer systems, etc. For instance, a user of computing device 102 may develop a web application using webapp development application 116 implemented by computing device 102. Webapp development application 116 may be a proprietary or commercially available webapp development application such as WordPress®, Movable Type®, Joomla!®, Drupal®, XOOPS®, TYPO3®, etc. Webapp development application 116 may generate a web application 130 by generating a folder 118 in storage 106 that contains objects 120. Objects 120 include a plurality of objects (e.g., files, data, etc.) that make up web application 130. For instance, objects 120 may include servlets, HTML (hypertext markup language) pages (e.g., an "index.html file", etc.), classes, image files (e.g., .gif files, .jpg files, etc.), XML (extensible markup language) files (e.g., .xml files), PHP files (e.g., .php files), a database such as a MySQL database (e.g., .sql files), and/or further types of objects. Objects 120 may include web application-specific objects.

A user may develop web application 130, generating objects 120, using webapp development application 116, which is not provided by web development tool 114. Web development tool 114 may subsequently be invoked to open folder 118 to enable the user to further develop web application 130 and/or to publish web application 130 to a remote server. In contrast to conventional tools, web development tool 114 is configured to identify webapp development application 116 used to develop web application 130 by opening and analyzing objects 120 in folder 118. For example, in an embodiment, web development tool 114 may receive a configuration feed 122 from configuration server 104. Configuration feed 122 may include information, such as web application signatures, which web development tool 114 may use to identify webapp development application 116. Based on the identification of webapp development application 116, web development tool 114 may request a web deployment package 124 for the identified webapp development application from deployment package server 108. Web development tool 114 may apply settings and/or transformations indicated in web deployment package 124 to objects 120 to enable web application 130 to be locally used and/or published. For instance, as shown in FIG. 1, web development tool 114 may publish web application 130 to publication server 110 as published web application 126. Published web application 126 is operational at publication server 110 and may be accessed by users at further computing devices coupled to network 112.

Figure 2:
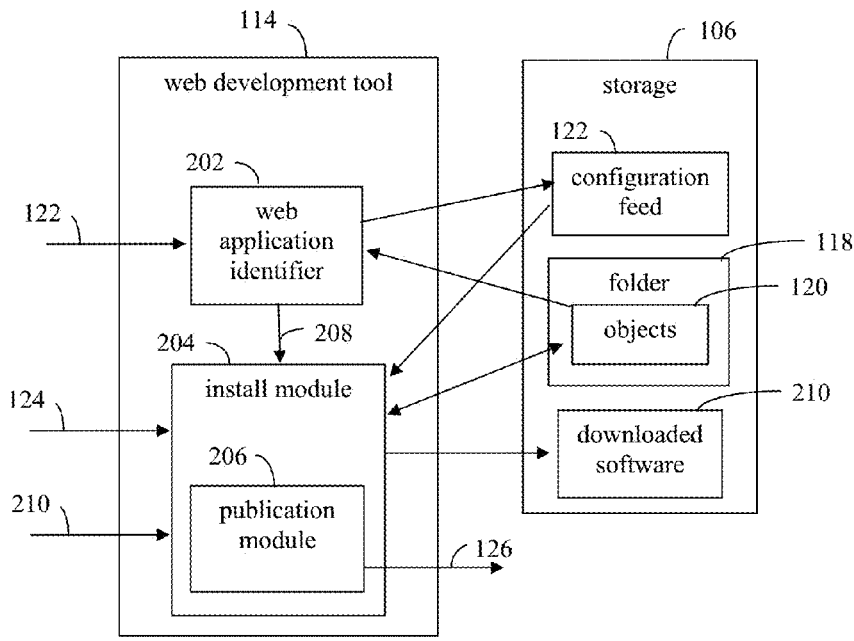
FIG. 2 shows a block diagram of a web development tool configured to enable a web application developed by a webapp development application to be identified and published, according an example embodiment.

In embodiments, web development tool 114 may be configured in various ways to enable a web application to be used locally and/or published. For instance, FIG. 2 shows a block diagram of web development tool 114 and storage 106 of FIG. 1, according an example embodiment. As shown in the example of FIG. 2, web development tool 114 includes a web application identifier 202 and an install module 204. Furthermore, install module 204 includes a publication module 206. The features of FIG. 2 are described as follows.

Web application identifier 202 is configured to open folders in storage that contain objects that define a web application. For example, as shown in FIG. 2, web application identifier 202 may open folder 118 containing objects 120 for web application 130 (of FIG. 1). Furthermore, web application identifier 202 receives configuration feed 122 that includes a plurality of webapp development application signatures that correspond to a plurality of webapp development applications. Web application identifier 202 is configured to identify a webapp development application used to develop the web application corresponding to objects 120 using the signatures received in configuration feed 122. For instance, as described in further detail below, web application identifier 202 may compare keys provided in the signatures to features of objects 120 to identify the webapp development application used to develop the web application. As shown in FIG. 2, web application identifier 202 generates an identified web application indication 208, which indicates the identified webapp development application. As such, the web application may be identified according to the identified webapp development application (e.g., as a WordPress® web application, a Joomla!® web application, etc.)

As shown in FIG. 2, install module 204 receives identified web application indication 208. Install module 204 is configured to download a web deployment package (e.g., web deployment package 124) for the webapp development application identified in identified web application indication 208. Furthermore, install module 204 may optionally retrieve and install additional software, shown as downloaded software 210 in FIG. 2, which is identified in configuration feed 122 as supporting the web application at the local computing device. Install module 204 applies the downloaded web deployment package to objects 120 of folder 118 to enable the web application corresponding to objects 120 to be published to a server and/or locally used. For instance, install module 204 may apply settings, may perform transformations, and/or may perform other changes to objects 120 based on the downloaded web deployment package.

Publication module 206 is configured to publish the web application corresponding to objects 120 to a server (e.g., publication server 110 of FIG. 1). For instance, publication module 206 may transmit a copy of objects 120 to publication server 110, to be accessible at the network address (e.g., URL—uniform resource locator) designated for the web application. Publication module 206 may perform transformations to objects 120 during the copy to point to locations at publication server 110.

Figure 3:
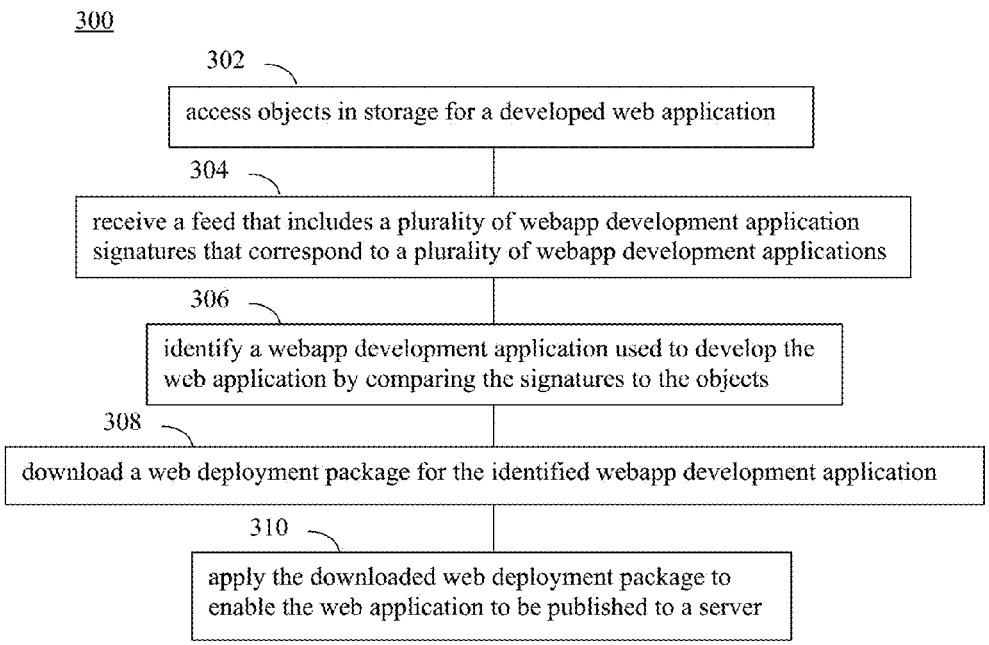
FIG. 3 shows a flowchart providing a process for enabling a web application developed by a webapp development application to be identified and published, according to an example embodiment.

Web development tool 114 may perform these functions in various ways. For instance, FIG. 3 shows a flowchart 300 providing a process for identifying a web application and enabling the identified web application to be locally used and/or published, according to an example embodiment. Flowchart 300 is described with reference to FIGS. 4-8 in the following subsections. In the next subsection, techniques for identifying web applications are described with reference to flowchart 300 and FIGS. 4-6. In the subsequent subsection, techniques for enabling the identified web applications to be locally used and/or published are described with reference to flowchart 300 and FIGS. 7-9.

A. Embodiments for Identifying Web Applications

Figure 4:
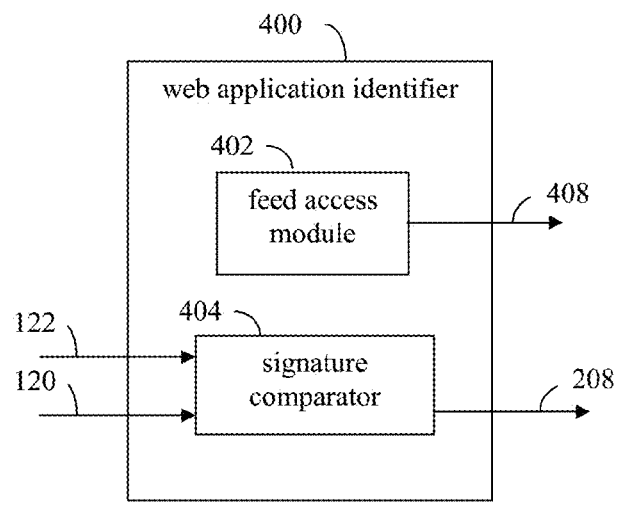
FIG. 4 shows a block diagram of a web application identifier, according to an example embodiment.

Web applications may be identified in various ways, according to embodiments. For instance, FIG. 4 shows a block diagram of a web application identifier 400, according to an example embodiment. Web application identifier 400 is an example of web application identifier 202 of FIG. 2, and may be configured to perform steps 304 and 306 of flowchart 300. As shown in FIG. 4, web application identifier 400 includes a feed access module 402 and a signature comparator 404. Further structural and operational embodiments will be apparent to persons skilled in the relevant art(s) based on the following discussion regarding flowchart 300.

Flowchart 300 begins with step 302. In step 302, objects in storage for a developed web application are accessed. For instance, as shown in FIG. 4, web application identifier 202 of web development tool 114 may be configured to open folder 118 in storage 106 containing objects 120 or may access objects corresponding to a web application in another way (e.g., stored in "project" form, etc.). Web application identifier 202 may be configured to open folder 118 in any manner, as would be known to persons skilled in relevant art(s). For instance, in an embodiment, web development tool 114 may generate a user interface with which a user of web development tool 114 (e.g., a developer) may interact. The user may use the user interface to navigate to and/or otherwise select folder 118 to be opened. In embodiments, folder 118 may be compressed (e.g., a zip file containing objects 120 in compressed form, or other compressed file type) or may be uncompressed. When folder 118 is compressed, opening of folder 118 according to step 302 may decompress folder 118 and its contents.

In step 304, a feed is received that includes a plurality of webapp development application signatures that correspond to a plurality of webapp development applications. For example, as shown in FIG. 4, feed access module 402 may transmit a feed request 408 to configuration server 104 to request a copy of configuration feed 122. In response to feed request 408, configuration server 104 may transmit configuration feed 122, which may be received by web application identifier 400.

For instance, in an embodiment, feed access module 402 may store a network address for configuration server 104 that may be used to request configuration feed 122 using feed request 408. The network address may be stored/provided by an administrator of web development tool 114, may be set during an installation of web development tool 114, or may be otherwise provided. Feed access module 402 may transmit feed request 408 each time a folder is opened for a web application, on a periodic basis, or at any other time(s) or according to any other schedule.

Figure 5:
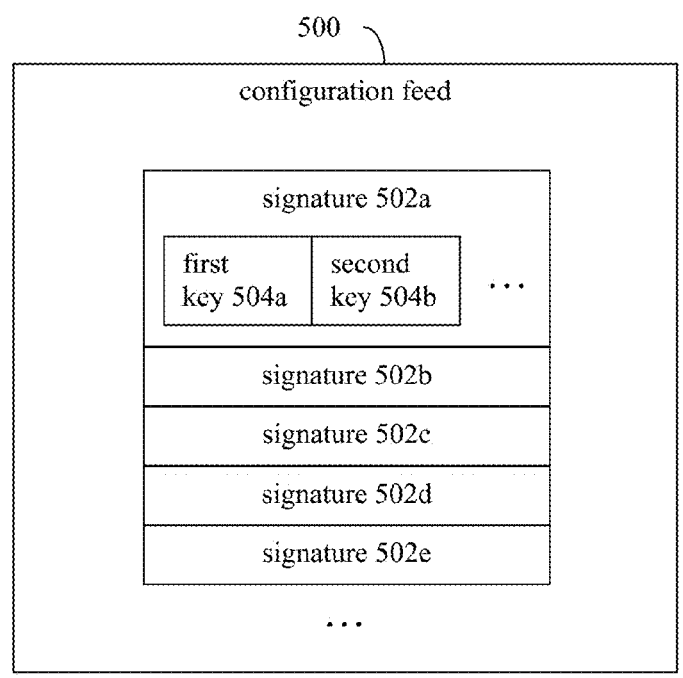
FIG. 5 shows a block diagram of an example configuration feed, according to an embodiment.

Configuration feed 122 may have any form. In an embodiment, configuration feed 122 may be a file or document, such as an XML (extensible markup language) document or document formatted according to other data format or code/programming language. FIG. 5 shows a block diagram of a configuration feed 500, according to an example embodiment. Configuration feed 500 is an example of configuration feed 122 of FIG. 1. As shown in FIG. 5, configuration feed 500 includes a plurality of web application signatures 502a-502e. Although five web application signatures 502a-502e are shown in FIG. 5 for purposes of illustration, any number of web application signatures 502 may be included in configuration feed 500, including tens, hundreds, thousands, and even greater numbers of web application signatures. Each signature 502 corresponds to a particular webapp development application. For instance, signature 502a may correspond to Joomla!, signature 502b may correspond WordPress, etc.

Each signature 502 includes one or more signature features or "keys" that may be used to identify the corresponding webapp development application. For instance, as shown in FIG. 5, signature 502a includes a first key 504a, a second key 504b, and may include further keys 504. Although keys are not shown for signatures 502b-502e in FIG. 5 for ease of illustration, each of signatures 502b-502e may include any number of keys.

Each key 504 of signature 502a may assist in identifying the webapp development application corresponding to signature 502a. For instance, one set of keys 504 of signature 502a (e.g., first key 504a) may be used to identify the webapp development application, and a second set of keys 504 of signature 504b (e.g., second key 504b) may be used to identify the version of the webapp development application. Any number and type of keys 504 may be present. For example, first key 504a for signature 502a may be a file extension for a file of the web application, second key 504b for signature 502a may be a text string that may be present in the header of a particular file of the web application, a third key for signature 502a may be a numerical code that may be present in a field of a database file for the web application, etc. Additional and/or alternative types of keys may be present.

Referring back to FIG. 3, in step 306, a webapp development application used to develop the web application is identified by comparing the signatures to the objects. For example, as shown in FIG. 4, signature comparator 404 receives objects 120 and configuration feed 122. Signature comparator 404 is configured to compare the signatures (e.g., signatures 502a-502e) received in configuration feed 122 to features of objects 120 to identify the webapp development application used to develop the web application. In an embodiment, signature comparator 404 may iterate through each signature, one-by-one, until a matching signature is found. For instance, referring to FIG. 5, signature comparator 404 may first compare signature 502a to objects 120. If a match does not occur, signature comparator 404 may next compare signature 502b to objects 120. If a match does not occur, signature comparator 404 may next compare signature 502c to objects 120. Signature comparator 404 may continue to iterate through signatures until a match is determined. The webapp development application corresponding to the matching signature is indicated in indication 208 as the webapp development application used to develop the web application.

In an embodiment, signature comparator 404 may compare keys (e.g., keys 504 of FIG. 5) included in each signature to identify the webapp development application. For instance, signature comparator 404 may compare application keys in the signatures to identify the webapp development application, and may then compare version keys of the matching signature to determine the version of the webapp development application.

Figure 6:
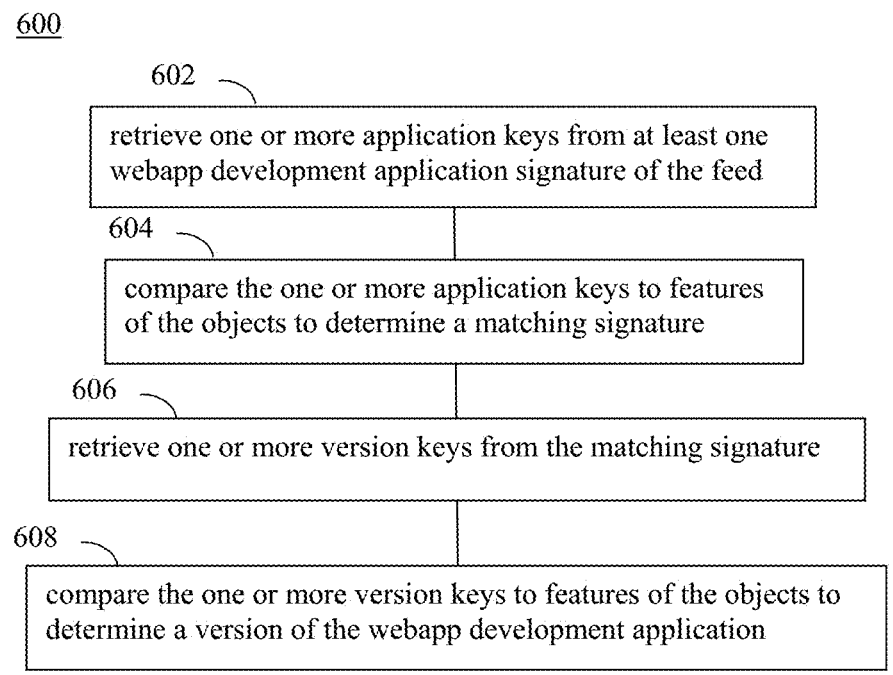
FIG. 6 shows a flowchart providing a process for determining a webapp development application used to develop a web application, according to an example embodiment.

For instance, FIG. 6 shows a flowchart 600 providing a process for determining a webapp development application used to develop a web application, according to an example embodiment. Flowchart 600 may be performed by signature comparator 404 in an embodiment. For instance, steps 602 and 604 may be performed to identify the webapp development application, and steps 606 and 608 may optionally be performed to identify a version of the identified webapp development application (if multiple versions exist). Further structural and operational embodiments will be apparent to persons skilled in the relevant art(s) based on the following discussion regarding flowchart 600.

Flowchart 600 begins with step 602. In step 602, one or more application keys are retrieved from at least one signature of the feed. For example, referring to FIG. 4, signature comparator 404 may retrieve one or more application keys from the first signature to be used to attempt a match. As described above, a variety of application keys may be present, including file extension keys, file text strings (e.g., to match text in headers or other file locations), data strings (e.g., to match data in one or more database fields), and/or other types of application keys that may be matched against files, file contents, database contents, and/or other objects of objects 120.

In step 604, the one or more application keys are compared to features of the objects to determine a matching signature. In an embodiment, signature comparator 404 compares application keys of the signatures of configuration feed 122 to corresponding features of objects 120 to determine a matching signature.

For instance, as described above, signature comparator 404 may iterate through the webapp development application signatures. If the application keys of the first signature match the corresponding features of objects 120, the first signature is a match, and the webapp development application corresponding to the first signature is identified as having been used to develop the web application. If one or more of the application keys of the first signature do not match the corresponding features of objects 120, the first signature is not a match. In such case, signature comparator 404 may attempt to match the application keys of the next signature, and potentially further signatures, until a match is found, and the corresponding webapp development application is identified.

In step 606, one or more version keys are retrieved from the matching signature. For example, referring to FIG. 4, signature comparator 404 may retrieve one or more version keys from the matching signature determined in step 604. As described above, a variety of version keys may be present, including file extension keys, file text strings (e.g., to match a version indication in headers or other file locations), data strings (e.g., to match a version indication provided in one or more database fields), and/or other types of version keys that may be matched against files, file contents, database contents, and/or other objects of objects 120.

In step 608, the one or more version keys are compared to features of the objects to determine a version of the webapp development application. In an embodiment, signature comparator 404 compares version keys of the matching signature to corresponding features of objects 120 to determine a version of the identified webapp development application. For instance, signature comparator 404 may iterate through multiple version keys of the matching signature until a match is found between a version key and a feature of objects 120, identifying the version associated with the matching version key as the version of the identified webapp development application. In another example, a version key may indicate a location (e.g., a field, header location, etc.) in a file, database, or other object of objects 120 where a version of the web application is indicated. The version may be determined by reading the value from the location.

After the webapp development application and its version (optionally) are determined, signature comparator 404 may generate identified web application indication 208 (as shown in FIGS. 2 and 4) to identify the webapp development application used to develop the web application. If none of the signatures successfully identify the webapp development application, indication 208 may be generated to have a null value or may otherwise indicate that a webapp development application was not identified. In such case, a user interface generated by web development tool 114 may indicate that a webapp development application was not determined, and may await user instructions/action.

Figures 7, 8:
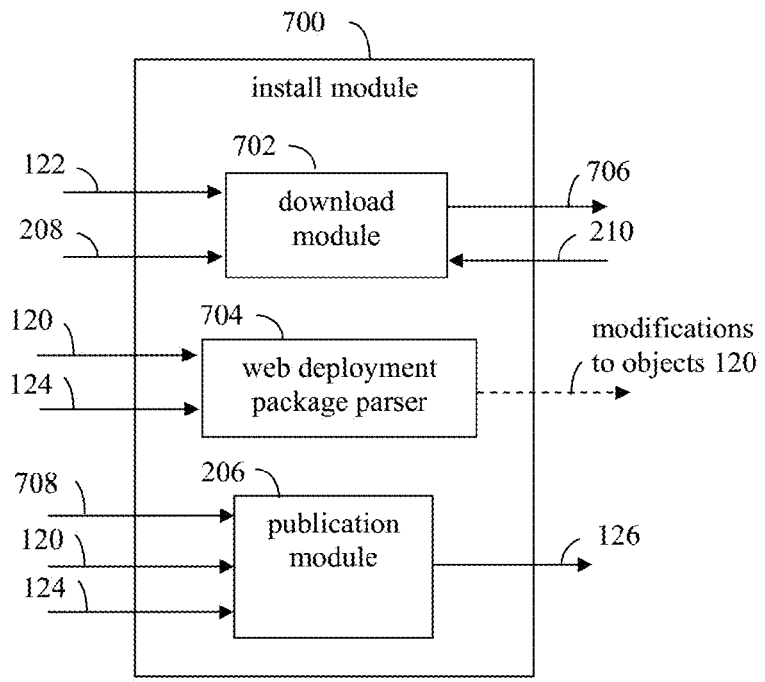
FIG. 7 shows a block diagram of an install module, according to an example embodiment.
FIG. 8 shows a process for processing objects of a web application, according to an example embodiment.

B. Embodiments for Enabling Identified Web Applications to be Locally Used and/or Published Web applications identified as described above may be configured for publication in various ways, according to embodiments. For instance, FIG. 7 shows a block diagram of an install module 700, according to an example embodiment. As shown in FIG. 7, install module 700 includes a download module 702 and a web deployment package parser 704. Install module 700 is an example of install module 204, and may be configured to perform steps 308 and 310 of flowchart 300 of FIG. 3. As such, steps 308 and 310 are described as follows with reference to install module 700 of FIG. 7.

Referring to FIG. 3, in step 308, a web deployment package for the identified webapp development application is downloaded. For example, as shown in FIG. 7, download module 702 receives identified web application indication 208. Download module 702 of install module 700 is configured to download a web deployment package for the webapp development application identified by indication 208. Configuration feed 122 may indicate the network address from which the web deployment package may be downloaded for the identified webapp development application, and/or the network address may be included in identified web application indication 208 by web application identifier 202. As such, download module 702 may download the web application package from the indicated network address. For example, as shown in FIG. 7, download module 702 may transmit a package download request 706 to a deployment package server for the identified webapp development application, such as deployment package server 108. The deployment package server receives package download request 706, and transmits the web deployment package to install module 700 in response.

In embodiments, a web deployment package, such as web deployment package 124 of FIG. 1, may be developed for each different webapp development application. The web deployment package for a webapp development application includes transformations, settings/attributes, and/or provides other information. The web deployment package is configured to be applied to objects 120 developed by the webapp development application to enable the web application corresponding to objects 120 to be locally used and/or published.

As such, in embodiments, a web deployment package, such as web deployment package 124 of FIG. 1, may be developed for each different webapp development application such that many (e.g., tens, hundreds, etc.) of web deployment packages are available for a corresponding number of webapp development applications. Furthermore, a particular webapp development application that has multiple versions may have multiple web deployment packages available for download corresponding to the multiple versions of the webapp development application that are available. In other cases, a web deployment package may be associated with multiple versions of a webapp development application.

In step 310, the downloaded web deployment package is applied to enable the web application to be published to a server. For example, as shown in FIG. 7, web deployment package parser 704 receives objects 120 and web deployment package 124. Web deployment package parser 704 is configured to apply a portion or all of the transformations, settings, and/or other indicated functions of web deployment package 124 to objects 120.

In an embodiment, web deployment package parser 704 may be configured to perform a process shown in FIG. 8. FIG. 8 shows a step 802 providing a process for processing objects of a web application, according to an example embodiment. In step 802, at least one transformation indicated in the downloaded web deployment package is applied to at least one of the objects. For example, as shown in FIG. 7, web deployment package parser 704 receives objects 120 and web deployment package 124. Web deployment package 124 may include one or more transformations to be performed on objects associated with a web application to enable the web application to be locally used and/or published. The transformations may be transformations that are specific to the particular webapp development application (and optionally to the particular version) for which web deployment package 124 is configured. Web deployment package parser 704 may parse web deployment package 124 to determine the transformations, and may apply each of the transformations to objects 120.

For instance, in one embodiment, web deployment package parser 704 may transform one or more links (e.g., a root link location) and/or pointers in one or more of objects 120 from current values to values for the current location of objects 120 in the computing device (e.g., computing device 102 of FIG. 1). For instance, a user may have copied objects 120 from a first location to a current location, and as such, links and/or pointers in objects 120 may be invalid. Web deployment package parser 704 may convert the links/pointers to the current location. Such changes may be made in one or more files (e.g., web pages), databases, etc., of objects 120.

Figure 9:
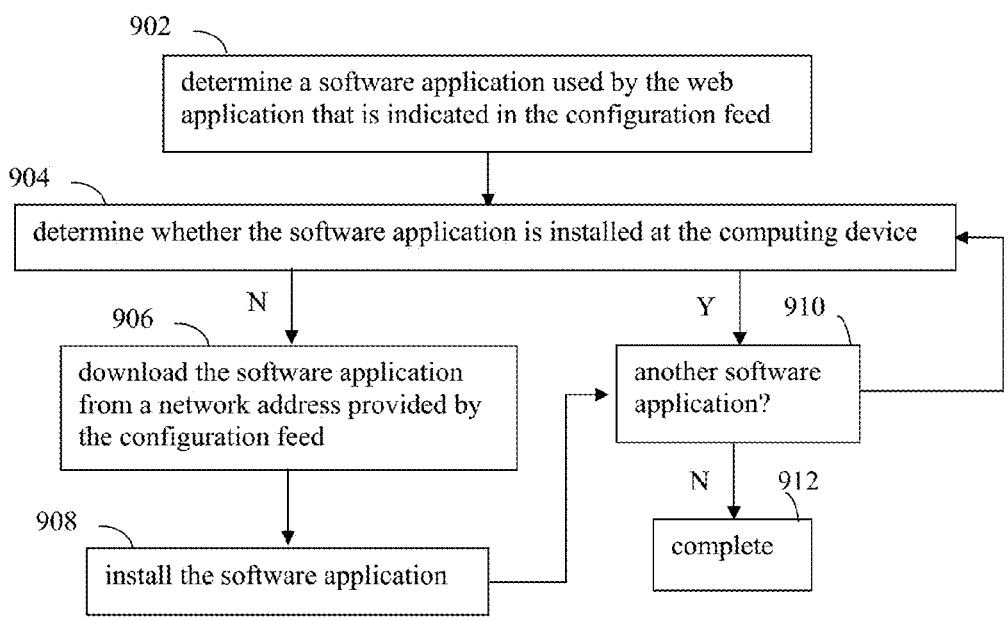
FIG. 9 shows a flowchart providing a process for downloading software to support a web application, according to an example embodiment.

Further processing may be performed on objects 120 so that web application 130 may operate properly. For instance, in an embodiment, download module 702 of FIG. 7 may be configured to perform a process shown in FIG. 9. FIG. 9 shows a flowchart 900 providing a process for downloading software to support a web application, according to an example embodiment. Further structural and operational embodiments will be apparent to persons skilled in the relevant art(s) based on the following discussion regarding flowchart 900.

Flowchart 900 begins with step 902. In step 902, a software application used by the web application is determined that is indicated in the configuration feed. For instance, as shown in FIG. 7, download module 702 may receive configuration feed 122. Configuration feed 122 may indicate one or more software applications that need to be present for the web application corresponding to the identified webapp development application. Any number and type of software applications may be indicated in configuration feed 122 for the web application, such as PHP software (e.g., a PHP compiler, etc.), MySQL software (for database support), etc.

In step 904, whether the software application is installed at the computing device is determined. In an embodiment, download module 702 may determine whether a software application indicated as needing to be present for the web application is already installed on the computing device. Download module 702 may be configured to make the determination in any manner, as would be known to persons skilled in the relevant art(s). If the software application is determined to not be installed, operation proceeds to step 906. If the software application is determined to be already installed, operation proceeds to step 910.

In step 906, the software application is downloaded from a network address provided by the downloaded web deployment package. In an embodiment, if the software application is not already downloaded, download module 702 may transmit a download request 706 to a vendor/provider of the software application. For instance, download request 706 may be transmitted to a network address indicated in configuration feed 122 for the software application vendor/provider. In response to download request 706, downloaded software 210 may be received from the software application vendor/provider by download module 702 (and stored in storage 106, as shown in FIG. 2). Operation proceeds from step 906 to step 908.

In step 908, the software application is installed. In an embodiment, download module 702 may install downloaded software 210 after being downloaded. Download module 702 may install downloaded software 210 in any manner, as appropriate for the particular downloaded software, as would be known to persons skilled in the relevant art(s). Operation proceeds from step 908 to step 910.

In step 910, whether another software application is to be downloaded and installed is determined. If download module 702 determines that another software application is indicated in configuration feed 122 to be downloaded for the web application, operation proceeds to step 904. If download module 702 determines that another software application is not indicated in configuration feed 122 to be downloaded for the web application, operation is complete at step 912.

At some point in time, a user of web development tool 114 may decide to publish web application 130 to a remote server, such as publication server 110. For instance, a user may interact with a user interface generated by web development tool 114 to submit a publication request for web application 130 to be published at a remote server. For instance, as shown in FIG. 7, publication module 206 of install module 700 may receive a publication request 708 input by the user for web application 130. In such case, publication module 206 is configured to publish web application 130 to the remote server indicated by the user. For instance, as shown in FIG. 1, web application 130 may be published to publication server 110 as published web application 126.

In an embodiment, publication module 206 may make a copy of objects 120 to transmit to publication server 110. Furthermore, publication module 206 may apply one or more transformations indicated in the downloaded web deployment package for the web application to the copied objects to generate modified objects. The copied objects, including the modified copied objects, are transmitted to publication server 110 by publication module 206 to generate published web application 126 at publication server 110.

For instance, in one embodiment, publication module 206 may perform step 802 of FIG. 8 to objects 120. For example, publication module 206 may transform one or more links in one or more of objects 120 from links that are local to the computing device (e.g., computing device 102 of FIG. 1) to links that are specific to the remote server to which the web application is being published (e.g., publication server 110). For instance, a user of web development tool 114 may have provided a root URL (e.g., /remotewebapplicationaddress) hosted at the remote server at which the web application is to be published. In objects 120, web deployment package parser 704 may convert a local root address (e.g., /home/username/webapplication) to the specified remote host root URL (e.g., /remotewebapplicationaddress). Such changes may be made in one or more files (e.g., web pages), databases, etc., of objects 120.

Further examples of transformations that may be performed by publication module 206 include pointing one or more of objects 120 to a new database location at the remote server (when objects 120 include a database that is copied to the remote server), and changing of other settings in objects 120 to enable web application publication to a remote server, as would be known to persons skilled in the relevant art(s). For instance, publication module 206 may be configured to script out a database of objects 120 at computing device 102. Publication module 206 may then modify links in the scripted out form of the database from local links to remote links. The modified scripted out database may then be transmitted to publication server 110 for installation, to be accessible by published web application 126.

Note that publication module 206 (or a separate module of install module 700) may perform step 802 to objects 120 to enable web application 130 to be used locally at computing device 102. For instance, one or more links in one or more of objects 120 by be transformed to links that are local to the computing device from links that are not local to the computing device. For instance, this may be performed if objects 120 were copied from another computing device to computing device 102. In another example, web development tool 114 may not know the location of an application database used by web application 130 (e.g., due to the copying of objects 120, etc.). By identifying the type of web application, and applying the information of web deployment package 124, web development tool 114 may enable a user to connect to and edit the application database of web application 130 directly. In further embodiments, further transformations, etc., may be performed on objects 120 to enable web application 130 to be used locally.

In still another embodiment, web application 130 may have been previously installed and running at publication server 110. It may be desired to make an operational copy of web application 130 at computing device 102. In this case, web application 130 may be remotely identified by web development tool 114 as described herein based on objects 120 at publication server 120. These object may be examined on-demand, and then web development tool 114 may install software locally for web application 130 based on the identification, may download web application 130 to computing device 120 (including its database, if applicable), and may apply transforms to objects 120 of the downloaded instance of web application 130 so that web application 130 may be used locally on computing device 102.

III Example Computing Device Embodiments

Web development tool 114, web application identifier 202, install module 204, publication module 206, web application identifier 400, feed access module 402, signature comparator 404, download module 702, web deployment package parser 704, flowchart 300, flowchart 600, step 802, and flowchart 900 may be implemented in hardware, software, firmware, or any combination thereof. For example, web development tool 114, web application identifier 202, install module 204, publication module 206, web application identifier 400, feed access module 402, signature comparator 404, download module 702, web deployment package parser 704, flowchart 300, flowchart 600, step 802, and/or flowchart 900 may be implemented as computer program code configured to be executed in one or more processors. Alternatively, web development tool 114, web application identifier 202, install module 204, publication module 206, web application identifier 400, feed access module 402, signature comparator 404, download module 702, web deployment package parser 704, flowchart 300, flowchart 600, step 802, and/or flowchart 900 may be implemented as hardware logic/electrical circuitry. For instance, in an embodiment, one or more of web development tool 114, web application identifier 202, install module 204, publication module 206, web application identifier 400, feed access module 402, signature comparator 404, download module 702, web deployment package parser 704, flowchart 300, flowchart 600, step 802, and/or flowchart 900 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

As described above, web development tool 114 may generate one or more user interfaces. For instance, web development tool 114 may enable user input to be provided from one or more of any type of user interface elements provided by computing device 102, including a keyboard, a thumb wheel, a pointing device, a roller ball, a stick pointer, a touch sensitive display, any number of virtual interface elements, a voice recognition system, etc.

Figure 10:
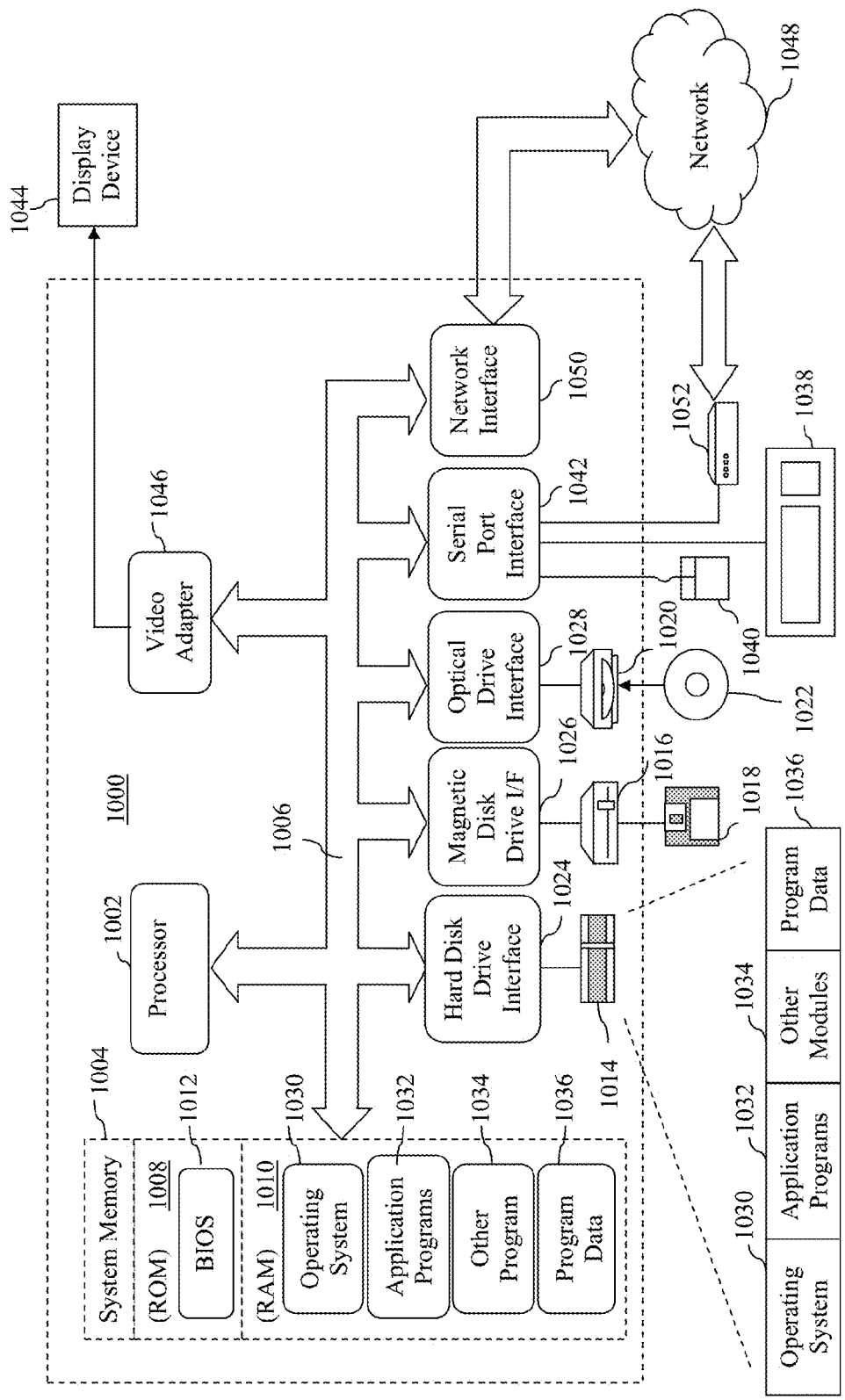
FIG. 10 shows a block diagram of an example computer that may be used to implement embodiments of the present invention.

FIG. 10 depicts an exemplary implementation of a computer 1000 in which embodiments of the present invention may be implemented. For example, computing device 102, configuration server 104, deployment package server 108, and/or publication server 110 may be implemented in a computer system similar to computer 1000, including one or more features of computer 1000 and/or alternative features.

Computer 1000 may be a general-purpose computing device in the form of a conventional personal computer, a mobile computer, a server, or a workstation, for example, or computer 1000 may be a special purpose computing device. The description of computer 1000 provided herein is provided for purposes of illustration, and is not intended to be limiting. Embodiments of the present invention may be implemented in further types of computer systems, as would be known to persons skilled in the relevant art(s).

As shown in FIG. 10, computer 1000 includes one or more processors 1002, a system memory 1004, and a bus 1006 that couples various system components including system memory 1004 to processor 1002. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computer 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1030, one or more application programs 1032, other program modules 1034, and program data 1036. Application programs 1032 or program modules 1034 may include, for example, computer program logic for implementing web development tool 114, web application identifier 202, install module 204, publication module 206, web application identifier 400, feed access module 402, signature comparator 404, download module 702, web deployment package parser 704, flowchart 300, flowchart 600, step 802, and/or flowchart 900 (including any step of flowcharts 300, 600, and 900), and/or further embodiments described herein.

A user may enter commands and information into the computer 1000 through input devices such as keyboard 1038 and pointing device 1040. Other input devices (not shown) may include a microphone, joystick, game pad, satellite dish, scanner, or the like. These and other input devices are often connected to processor 1002 through a serial port interface 1042 that is coupled to bus 1006, but may be connected by other interfaces, such as a parallel port, game port, or a universal serial bus (USB).

A display device 1044 is also connected to bus 1006 via an interface, such as a video adapter 1046. In addition to the monitor, computer 1000 may include other peripheral output devices (not shown) such as speakers and printers.

Computer 1000 is connected to a network 1048 (e.g., the Internet) through an adaptor or network interface 1050, a modem 1052, or other means for establishing communications over the network. Modem 1052, which may be internal or external, is connected to bus 1006 via serial port interface 1042.

As used herein, the terms "computer program medium," "computer-readable medium," and "computer-readable storage medium" are used to generally refer to media such as the hard disk associated with hard disk drive 1014, removable magnetic disk 1018, removable optical disk 1022, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1032 and other program modules 1034) may be stored on the hard disk, magnetic disk, optical disk, ROM, or RAM. Such computer programs may also be received via network interface 1050 or serial port interface 1042. Such computer programs, when executed or loaded by an application, enable computer 1000 to implement features of embodiments of the present invention discussed herein. Accordingly, such computer programs represent controllers of the computer 1000.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

Example Embodiments

In one embodiment, a method in a web development tool in a computing device comprises: accessing objects in storage for a developed web application; receiving a feed that includes a plurality of signatures that correspond to a plurality of webapp development applications; identifying a webapp development application used to develop the web application by comparing the signatures to the objects; downloading a web deployment package for the identified webapp development application; and applying the downloaded web deployment package to enable the web application to be published to a server.

In an embodiment, the method further comprises: enabling the web application to be modified by a webapp development application associated with the web development tool by identifying the webapp development application used to develop the web application.

In an embodiment, the receiving comprises: receiving the feed over the Internet as an XML (extensible markup language) document.

In an embodiment, the identifying comprises: retrieving one or more application keys from at least one signature of the feed; and
comparing the one or more application keys to features of the objects to determine a matching signature, the matching signature corresponding to the identified webapp development application.

In an embodiment, the identifying further comprising: retrieving one or more version keys from the matching signature; and comparing the one or more version keys to features of the objects to determine a version of the webapp development application.

In an embodiment, the downloading a web deployment package for the identified webapp development application comprises: downloading the web deployment package from a network address provided by the matching signature.

In an embodiment, the method further comprises: publishing the web application to a server.

In an embodiment, the publishing the web application to a server comprises: applying at least one transformation indicated in the downloaded web deployment package to at least one of the objects to generate at least one modified object; and copying the at least one modified object to the server.

In an embodiment, the method further comprises: determining a software application used by the identified webapp development application that is indicated in the configuration feed; determining whether the software application is installed at the computing device; and if the software application is determined to not be installed at the computing device, downloading the software application from a network address provided by the configuration feed, and installing the software application at the computing device.

In another embodiment, a web development tool in a computing device comprises: a web application identifier configured to access objects in storage for a developed web application, to receive a feed that includes a plurality of signatures that correspond to a plurality of webapp development applications, each of the signatures including at least one key, and to identify a webapp development application used to develop the web application by comparing the signatures to the objects; and an install module configured to download a web deployment package for the identified webapp development application from a network address indicated in the feed, and to apply the downloaded web deployment package to the objects to enable the web application to be published to a server.

In an embodiment, the web application identifier includes a feed access module configured to retrieve the feed as an XML (extensible markup language) document over the Internet.

In an embodiment, the web application identifier includes a signature comparator that retrieves one or more application keys from at least one signature of the feed, and compares the one or more application keys to features of the objects to determine a matching signature, the matching signature corresponding to the identified webapp development application.

In an embodiment, the signature comparator retrieves one or more version keys from the matching signature, and compares the one or more version keys to features of the objects to determine a version of the webapp development application.

In an embodiment, the install module includes a download module that downloads the web deployment package from a network address provided by the matching signature.

In an embodiment, the install module includes a web deployment package parser that determines a software application used by the indicated webapp development application that is indicated in the configuration feed and determines whether the software application is installed at the computing device; and the download module downloads the software application from a network address provided by the configuration feed and installs the software application at the computing device if the software application is determined to not be installed at the computing device.

In an embodiment, the install module comprises: a publication module configured to publish the web application to a server.

In an embodiment, the publication module applies at least one transformation indicated in the downloaded web deployment package to at least one of the objects to generate at least one modified object, and copies the at least one modified object to the server.

In another embodiment, a computer program product comprises a computer usable storage medium having computer readable logic embodied in said storage medium for enabling a processor to configure a web application for publication, comprising: first means for enabling the processor to access objects in storage for a developed web application; second means for enabling the processor to identify a webapp development application used to develop the web application by comparing a plurality of signatures received in a feed to the objects, the plurality of signatures corresponding to a plurality of webapp development applications; third means for enabling the processor to download a web deployment package for the identified webapp development application; and fourth means for enabling the processor to apply the downloaded web deployment package to enable the web application to be published to a server.

In an embodiment, the second means comprises: means for enabling the processor to retrieve one or more application keys from at least one signature of the feed; means for enabling the processor to compare the one or more application keys to features of the objects to determine a matching signature, the matching signature corresponding to the identified webapp development application; means for enabling the processor to retrieve one or more version keys from the matching signature; and means for enabling the processor to compare the one or more version keys to features of the objects to determine a version of the webapp development application.

In an embodiment, the fourth means comprises: means for enabling the processor to apply at least one transformation indicated in the downloaded web deployment package to at least one of the objects; means for enabling the processor to determine a software application used by the webapp development application that is indicated in the configuration feed; means for enabling the processor to determine whether the software application is installed at the computing device; and means for enabling the processor to download the software application from a network address provided by the configuration feed and to install the software application if the software application is determined to not be installed at the computing device.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a web development tool in a computing device, comprising:
   accessing objects in storage for a developed web application;
   transmitting a request for information that enables identification of a plurality of web application development applications;
   receiving a plurality of signatures that enable identification of a plurality of web application development applications;
   identifying, using at least one processor of the computing device, a web application development application used to develop the web application by comparing the signatures to the objects;
   downloading a web deployment package for the identified web application development application; and
   applying the downloaded web deployment package to enable the web application to be published to a server.

2. The method of claim 1, further comprising:
   enabling the web application to be modified by a web application development application associated with the web development tool by identifying the web application development application used to develop the web application.

3. The method of claim 1, wherein said receiving comprises:
   receiving the plurality of signatures over the Internet as an XML (extensible markup language) document.

4. The method of claim 1, wherein said identifying comprises:
   retrieving one or more application keys from at least one signature of the plurality of signatures; and
   comparing the one or more application keys to features of the objects to determine a matching signature, the matching signature corresponding to the identified web application development application.

5. The method of claim 4, wherein said identifying further comprising:
   retrieving one or more version keys from the matching signature; and
   comparing the one or more version keys to features of the objects to determine a version of the web application development application.

6. The method of claim 4, wherein said downloading a web deployment package for the identified web application development application comprises:
   downloading the web deployment package from a network address provided by the matching signature.

7. The method of claim 1, further comprising:
   publishing the web application to a server.

8. The method of claim 7, wherein said publishing the web application to a server comprises:
   applying at least one transformation indicated in the downloaded web deployment package to at least one of the objects to generate at least one modified object; and
   copying the at least one modified object to the server.

9. The method of claim 1, further comprising:
   determining a software application used by the identified web application development application that is indicated in the plurality of signatures;
   determining whether the software application is installed at the computing device; and
   if the software application is determined to not be installed at the computing device,
      downloading the software application from a network address provided by a configuration feed in which the plurality of signatures is received, and
      installing the software application at the computing device.

10. A web development tool in a computing device, comprising:
    a web application identifier at least partially stored in a memory and configured to access objects in storage for a developed web application, provide a request for information that enables identification of a plurality of web application development applications, receive a plurality of signatures that enable identification of a plurality of web application development applications, each of the signatures including at least one key, and identify a web application development application used to develop the web application by comparing the signatures to the objects; and
    an install module at least partially stored in a memory and configured to download a web deployment package for the identified web application development application from a network address indicated in a configuration feed in which the plurality of signatures is received, and to apply the downloaded web deployment package to the objects to enable the web application to be published to a server.

11. The web development tool of claim 10, wherein the web application identifier includes an access module configured to retrieve the plurality of signatures as an XML (extensible markup language) document over the Internet.

12. The web development tool of claim 10, wherein the web application identifier includes a signature comparator that retrieves one or more application keys from at least one signature of the configuration feed, and compares the one or more application keys to features of the objects to determine a matching signature, the matching signature corresponding to the identified web application development application.

13. The web development tool of claim 12, wherein the signature comparator retrieves one or more version keys from the matching signature, and compares the one or more version keys to features of the objects to determine a version of the web application development application.

14. The web development tool of claim 12, wherein the install module includes a download module that downloads the web deployment package from a network address provided by the matching signature.

15. The web development tool of claim 14, wherein the install module includes a web deployment package parser that determines a software application used by the indicated web application development application that is indicated in the configuration feed and determines whether the software application is installed at the computing device; and
    the download module downloads the software application from a network address provided by the configuration feed and installs the software application at the computing device if the software application is determined to not be installed at the computing device.

16. The web development tool of claim 10, wherein the install module comprises:

a publication module configured to publish the web application to a server.

17. The web development tool of claim 16, wherein the publication module applies at least one transformation indicated in the downloaded web deployment package to at least one of the objects to generate at least one modified object, and copies the at least one modified object to the server.

18. A computing device, comprising:
at least one processor circuit; and
at least one memory that stores program code configured to be executed by the at least one processor circuit, the program code comprising:
a web application identifier configured to access objects in storage for a developed web application, provide a request for information that enables identification of a plurality of web application development applications, receive a plurality of signatures that enable identification of a plurality of web application development applications, and identify a web application development application used to develop the web application by comparing the signatures to the objects; and
an install module configured to download a web deployment package for the identified web application development application, and to apply the downloaded web deployment package to the objects to enable the web application to be published to a server.

19. The computing device of claim 18, wherein the web application identifier comprises a signature comparator configured to retrieve one or more application keys from at least one signature of the plurality of signatures, and compare the one or more application keys to features of the objects to determine a matching signature, the matching signature corresponding to the identified web application development application.

20. The computing device of claim 19, wherein the signature comparator is configured to retrieve one or more version keys from the matching signature, and compare the one or more version keys to features of the objects to determine a version of the web application development application.

* * * * *